United States Patent [19]
Bowers

[11] Patent Number: 5,795,122
[45] Date of Patent: Aug. 18, 1998

[54] ADJUSTABLE QUICK CONNECT FASTENER FOR ACCOMMODATING PANELS OF VARIOUS THICKNESSES

[76] Inventor: Ned C. Bowers, 7400 Ola Cir., Mt. Dora, Fla. 32757

[21] Appl. No.: 909,303

[22] Filed: Aug. 11, 1997

Related U.S. Application Data

[63] Continuation-in-part of Ser. No. 550,369, Oct. 30, 1995, Pat. No. 5,716,180, which is a continuation-in-part of Ser. No. 309,685, Sep. 21, 1994, abandoned.

[51] Int. Cl.$^6$ ............................ F16B 21/00; F16B 21/02
[52] U.S. Cl. ........................ 411/551; 411/553; 411/552
[58] Field of Search ............................ 411/105, 109, 411/550, 551, 552, 553, 554, 555, 948, 217

[56] References Cited

U.S. PATENT DOCUMENTS

| | | | |
|---|---|---|---|
| 442,642 | 12/1890 | Roby | 411/217 |
| 1,387,172 | 8/1921 | Postel | 411/948 X |
| 2,922,211 | 1/1960 | Boyd | 411/551 |
| 3,488,815 | 1/1970 | Metz | 411/555 |
| 5,690,460 | 11/1997 | Attanasio | 411/551 |

*Primary Examiner*—Neill R. Wilson
*Attorney, Agent, or Firm*—Lane, Aitken & McCann

[57] ABSTRACT

A fastener for holding panels together includes a grommet for engaging a first panel, a stud received in the grommet, and a receptacle for securement to a second panel, wherein the receptacle includes a body having an internally threaded bore, an externally threaded barrel member in engagement with the threads of the bore, curved slots in the barrel member for receiving a cross pin of the stud, and a mechanical arrangement for selectively locking the barrel member from movement relative to the body. The grommet can include diametrically opposed slots having open ends extending through an end of the grommet for receiving the cross pin of the stud. The mechanical arrangement can comprise slots on the barrel member and the receptacle body which are registrable with one another and a locking clip secured to the receptacle body, the locking clip comprising an annular portion biasing a fixing member into the registered slots. A removable element holds the fixing member out of the slot on the barrel member until the tightness of the fastener is adjusted.

33 Claims, 6 Drawing Sheets

ADJUSTABLE QUICK CONNECT FASTENER FOR ACCOMMODATING PANELS OF VARIOUS THICKNESSES

CROSS REFERENCE TO RELATED APPLICATION

This is a continuation-in-part of Ser. No. 08/550,369, filed Oct. 30, 1995, U.S. Pat. No. 5,716,180 which is a continuation-in-part of Ser. No. 08/309,685, filed Sep. 21, 1994, now abandoned.

BACKGROUND OF THE INVENTION

The present invention relates to quick connect fasteners for holding panels together and, more particularly, to ¼ turn fasteners which can be fastened and unfastened quickly and repeatedly.

Figure 1:
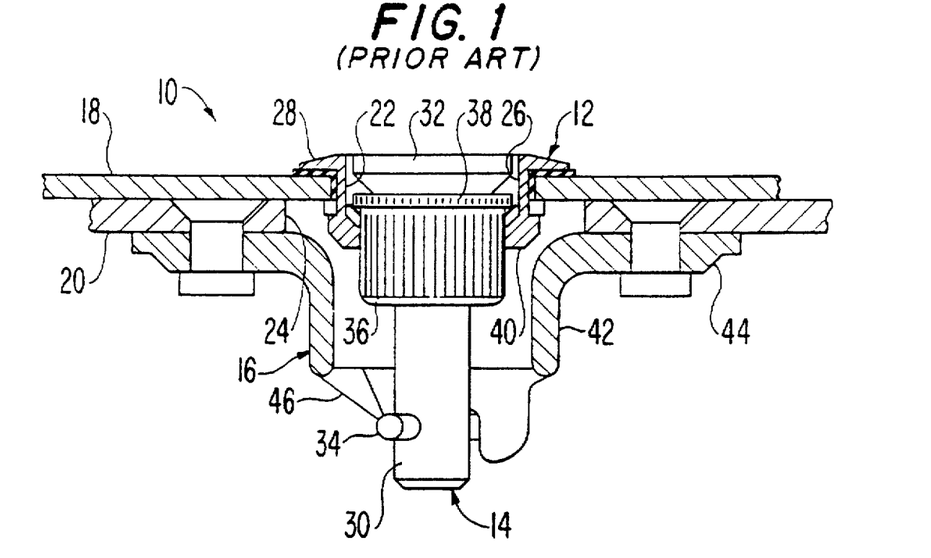
FIG. 1 is a cross section of a prior art fastener holding two panels together.

As can be seen from Prior Art FIG. 1, fasteners 10 of the ¼ turn type have been known which include a grommet 12, a stud 14 and a receptacle 16. The fastener 10 holds together two panels 18 and 20, with adjacent sides of the panels in contact with one another, by extending through openings 22 and 24 formed in the panels to receive the fastener. The grommet 12 has a cylindrical body 26 sized to extend through the opening 22 in one of the panels 18, usually an outer panel, and one end of the cylindrical body 26 has a radially outward extending flange 28 to engage the outer surface of the outer panel 18. The stud 14 has a shaft 30, a head 32, a cross pin 34 extending through the shaft at an end opposite to the head, a cup member 36 slidable along the shaft and a spring on the shaft between the head and cup member and received in the cup member. The stud 14 is received in the grommet 12, with the head 32 of the stud being adjacent to the flange 28 on the grommet and a radially outward extending flange 38 on the cup member 36 engaging a radially inward extending flange 40 at the end of the grommet 12 opposite to the radially outward extending flange 28. This arrangement keeps the head 32 of the stud 14 biased by the spring slightly outward from the radially outward extending flange 28 at the outer side of the outer panel 18. The cross pin 34 on the stud 14 prevents the assembly of the grommet 12 and the stud 14 from separating from the outer panel 18. Due to the presence of the cross pin 34 and the stiffness of the spring, a tool is required to move the cup member 36 adjacent to the head 32 by compressing the spring and thereby providing sufficient distance between the cross pin and the cup member that the stud can be inserted, at an angle, into the grommet. However, the geometry of this arrangement limits the axial length of the grommets 12 which can be used. Specifically, when the axial length of a grommet 12 reaches a certain magnitude, the stud 14 cannot be inserted into the grommet even when the cup member 36 is adjacent to the head 32.

The receptacle 16 of the fastener 10 has a generally cylindrical body 42 and a flange 44 projecting radially outward from one end of the body. The receptacle body 42 defines a central opening and has cam and locking surfaces 46 defined at an end opposite the radially outward extending receptacle flange 44. The receptacle flange 44 is placed against and secured to a side of the other panel 20, usually an inner panel, opposite to the side contacting the first panel 18, with the receptacle body 42 extending away from the side of the panel 20 to which the flange is attached. The panels 18 and 20 are brought together so that the stud 14 and the receptacle 16 are in alignment. The head 32 of the stud 14 is engaged by a turning tool, such as a screwdriver, pushed inwardly against the bias of the spring, and turned ¼ turn with the cross pin 41 of the stud in engagement with the cam and locking surfaces 46 of the receptacle 16. This action locks the fastener 10 in place with the two panels 18 and 20 in secure engagement with one another.

A drawback of such a fastener is that, for a stud of any particular length, the total thickness of the two panels for which the fastener is effective must lie within a very limited range, typically a range of 0.030 inches. If the total thickness lies outside the range, a longer or shorter stud 14 must be used. If the total thickness lies outside the range by more than a full width of the range, a stud 14 two sizes longer than the first size must be used. Accordingly, for most work, a variety of stud sizes must be purchased and kept on hand.

The outer diameter of the cylindrical body of the grommet is sized to engage the surface defining the opening through the outer panel, so that lateral shifting of the outer panel with respect to the fastener is prevented. As the thickness of the outer panel increases, the length of grommet required increases. However, longer grommets have also required longer studs to enable the cross pin of the stud to pass through the longer grommets, at an angle.

SUMMARY OF HE INVENTION

By the present invention, the drawbacks of the known fasteners have been overcome, and a wide range of panel thicknesses can be accommodated by a ¼ turn fastener in which each component is of a single size.

In order to accomplish this feature of the present invention, the receptacle is adjustable. More particularly, the receptacle includes an internally threaded body and an externally threaded barrel, wherein the threads of the body and the barrel are in engagement with one another so that rotation of the barrel relative to the body moves the barrel axially with respect to the body. Cam and locking surfaces for the cross pin of the stud are defined in the barrel. As a result, the position of the barrel within the receptacle body can be adjusted so that a single length stud can be used, and yet total panel thickness can be varied over a wide range. Where total panel thickness is relatively thin, the barrel can be rotated so that the cam and locking surfaces are relatively far from the receptacle side of the second panel. Where the total panel thickness is relatively thick, the barrel can be turned to attain a position in which the cam and locking surfaces are relatively close to the two panels. In either case, the cross pin of a stud of just one length engages the cam and locking surfaces of the barrel.

In order to positively lock the barrel with respect to the cylindrical body of the receptacle, when the desired position of the barrel has been set, semicylindrical grooves of equal diameter are drilled parallel to the axes of the barrel and the cylindrical body in the outer circumference of the barrel and in the inner annular surface of the cylindrical body. With each complete revolution of the barrel relative to the cylindrical body, the drilled grooves are in alignment with one another and, when the desired position of the barrel is achieved, the grooves are aligned and a spring roll pin of appropriate diameter is inserted into the aligned grooves to lock the barrel in the desired position.

In an alternate locking arrangement, the aligned grooves and spring roll pin are omitted in favor of a resilient fixing material interposed between the threads of the barrel and the threads of the cylindrical body. The resilient fixing material prevents movement of the barrel relative to the cylindrical body within the range of forces required to connect or disconnect the fastener. However, at a level of force beyond that required for connection and disconnection of the fastener, the resilient fixing material permits rotation of the barrel relative to the body. The rotation of the barrel changes the distance of the cam and locking surface from the two panels, thereby enabling the fastener to accommodate various panel thickness while using a stud of fixed length. In one disclosed embodiment, the resilient fixing material is in the form of a strip secured to the barrel, and in another embodiment, the resilient fixing material is in the form of a pellet secured in the barrel.

In another aspect of the present invention, the body of the grommet has a structure which permits a relatively short stud to be used with grommets of various length. Furthermore, the structure permits studs of various lengths to be used, if desired. More specifically, the structure involves diametrically opposed slots in the body of the grommet, the slots having open ends through the end of the grommet opposite to the end having the radially outward extending flange.

In another locking arrangement, a recess in the barrel member is registrable with an opening through the wall of the receptacle body, and a locking clip secured to the receptacle body comprises an annular portion biasing a fixing member into the registered opening and recess.

DETAILED DESCRIPTION OF THE PREFERRED EMBODIMENTS

Figure 2:
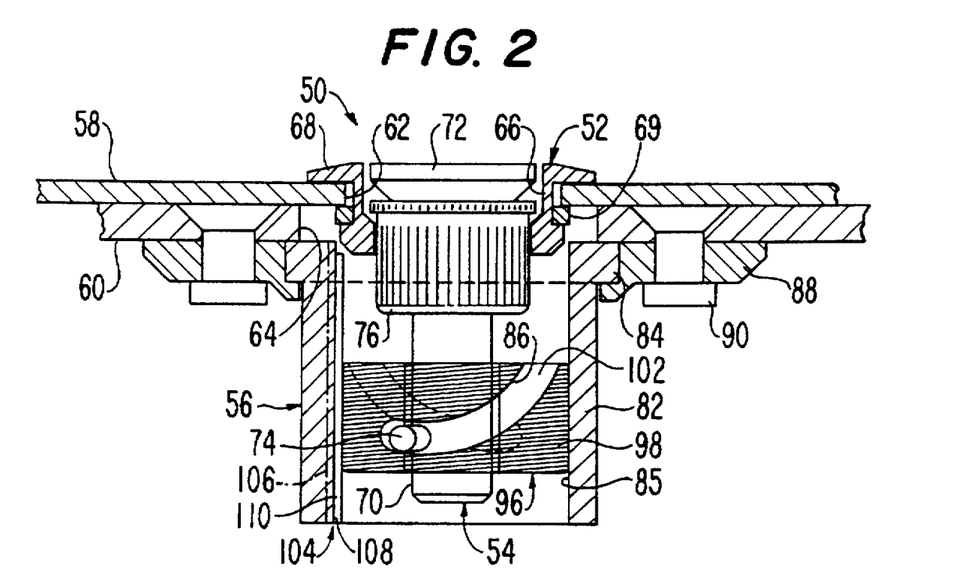
FIG. 2 is a cross section of the fastener according to the present invention holding two panels together.

As can be seen from FIG. 2, the adjustable fastener according to the present invention, which is designated generally by the reference numeral 50, is of the ¼ turn type, having a grommet 52, a stud 54, and a receptacle 56. The fastener 50 holds together two panels 58 and 60, with adjacent sides of the panels in contact with one another, by extending through openings 62 and 64 formed in the panels to receive the fastener. The grommet 52 has a cylindrical body 66 sized to extend through the opening 62 in one of the panels 58, usually an outer panel, and one end of the cylindrical body 66 as a radially outward extending flange 68 to engage the outer surface of the outer panel 58. The other end of the cylindrical body 66 has a radially outwardly extending shoulder or flange to engage a retaining ring 69 for retaining the grommet 52 on the outer panel 58. The stud 54 has a shaft 70, a head 72, a cross pin 74 extending through the shaft at an end opposite to the head, a cup member 76 slidable along the shaft and a spring on the shaft between the head and cup member and received in the cup member. The stud 54 is received in the grommet 52 with the head 72 of the stud being adjacent to the flange 68 on the grommet and a radially outward extending flange 78 on the cup member 76 engaging a radially inward extending flange 70 at the end of the grommet 52 opposite to the radially outward extending flange 68. This arrangement keeps the head 72 of the stud 54 biased by the spring slightly outward from the radially outward extending flange 68 at the outer side of the outer panel 58. The cross pin 74 on the stud 54 prevents the assembly of the grommet 52 and the stud 54 from separating from the outer panel 18. Due to the presence of the cross pin 74 and the stiffness of the spring, a tool is required to move-the cup member 76 adjacent to the head 72 by compressing the spring and hereby providing sufficient distance between the cross pin and the cup member that the stud can be inserted, at an angle, into the grommet. However, the geometry of this arrangement limits the axial length of the grommets 52 which can be used. Specifically, when the axial length of a grommet 52 reaches a certain axial length, the stud 54 cannot be inserted into the grommet even when the cup member 76 is adjacent to the head 32.

The receptacle 56 of the fastener 50 has a generally cylindrical body 82 and a flange 84 projecting radially outward from one end of the body. The receptacle body 82 defines a central opening and has cam and locking surfaces 86 defined at an end opposite the radially outward extending receptacle flange 84. The receptacle flange 84 is placed against and secured to a side of the other panel 60, usually an inner panel, opposite to the side contacting the first panel 58, with the receptacle body 82 extending away from the side of the panel 60 to which the flange is attached. The panels 58 and 60 are brought together so that the stud 54 and the receptacle 56 are in alignment. The head 72 of the stud 54 is engaged by a turning tool, such as a screwdriver, pushed inwardly against the bias of the spring, and turned ¼ turn with the cross pin 74 of the stud in engagement with the cam and locking surfaces 86 of the receptacle 56. This action locks the fastener 50 in place with the two panels 58 and 60 in secure engagement with one another.

The receptacle body 82 defines a central opening 85 and has internal threads throughout its axial length. The receptacle flange 84 is placed against and secured to a side of the other panel 60, usually an inner panel!, opposite to the side contacting the first panel 58, with the receptacle body 82 extending away from the side of the panel 60 to which the flange is attached. As can be appreciated from FIGS. 2 and 5, the flange 84 is attached by being retained in a cage 88 having an opening 90 smaller than the outer perimeter of the flange 84 and having ears 92 which are attached to the panel 60, such as by rivets 94. The receptacle 56 further includes a cylindrical barrel member 96 (which is not shown in cross section) having external threads 98 throughout its axial length, the barrel member 96 being sized so that the threads 98 engage the internal threads on the inner surface of the receptacle body 82 in normal threaded engagement. As can be seen from FIGS. 2 and 4, the barrel member 96 also has a central aperture 100 large enough to receive the shaft 70 of the stud 54. Diametrically opposed curved slots 102 each have a closed end and an open end extending through the end of the barrel member 96 facing the grommet 52. The curved slots 102 define the cam and locking surfaces 86, more specifically, cam surfaces leading to apices beyond which the slots 102 curve back toward the end of the barrel member 96 facing the grommet 52 to define locking surfaces for the cross pin 74 of the stud 54. The length of the cross pin 74 is greater than the inner diameter of the barrel member 96 but less than the central opening 85 of the receptacle body 82.

Figure 3:
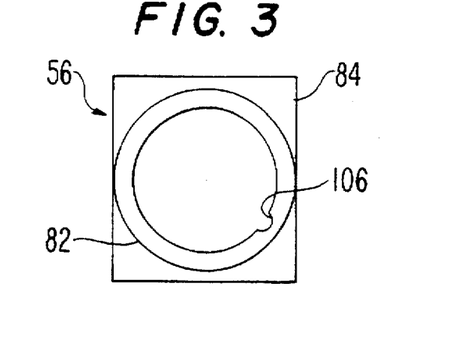
FIG. 3 is a bottom plan view of the cylindrical body of the receptacle of the fastener of FIG. 2.
Figure 4:
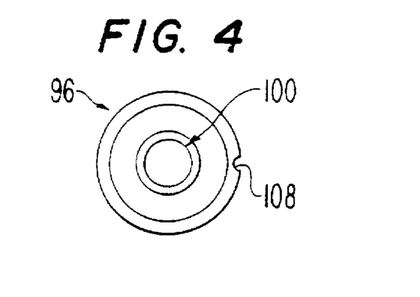
FIG. 4 is a bottom plan view of the barrel of the receptacle of the fastener of FIG. 2.
Figure 5:
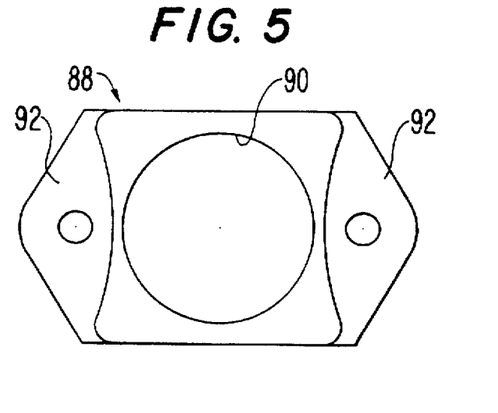
FIG. 5 is a cage for the receptacle of the fastener of FIG. 2.

As can be appreciated from FIGS. 2-4, a locking mechanism 104 is provided to prevent rotation of the barrel member 96 relative to the cylindrical body 82 of the receptacle 56 after the barrel member has been set in a desired position. The locking mechanism 104 includes a groove 106, semi-cylindrical in cross section, drilled in the inner annular surface of the receptacle body 82 in a direction generally parallel to the longitudinal axis of the receptacle body and a groove 108, semi-cylindrical in cross section, drilled in the outer annular surface of the barrel member 96 in a direction parallel to the direction of the groove 106 in the receptacle body 82. The grooves 106 and 108 in the receptacle body 82 and the barrel member 9 6 have the same radius of curvature in cross section. They are in alignment at one point for each rotation of the barrel member 96 relative to the cylindrical body 82. When the barrel member 96 is in the desired position and the grooves 106 and 108 are in alignment, a generally cylindrical roll spring pin 110 is compressed and inserted with a tool into the aligned grooves so that the roll spring pin occupies both grooves and, thereby, prevents rotation of the barrel member 96 relative to the receptacle body 82. Spring roll pins are known devices and typically comprise a strip of spring steel rolled into the shape of a cylinder having a small gap in its circumference. In the relaxed condition of the spring pin, the circumference is larger than the circumference of the opening into which the pin is to be inserted. Therefore, it is compressed, inserted into the opening and released, by which the pin is firmly retained in the opening.

The position of the barrel member 96 in the receptacle body 82 is set so that the cross pin 74 of the stud 54 can reach the apices of the cam and locking surfaces 86 and cause a spring on the stud 54 (FIG. 6) to be compressed when the cross pin is in engagement with the apices. For a stud 54 of a particular length, the relationship of the cross pin 74 and the curved slots 102 of the barrel member 96 will be determined by the total thickness of the two panels 58 and 60, as can be appreciated from FIG. 2. If the total panel thickness is greater than the total thickness of the panels illustrated in FIG. 2, the greater thickness can be accommodated, while using a stud 54 of the same length, by removing the roll spring pin 110, rotating the barrel member 96 so that the action of the threads moves the barrel member axially upward in the receptacle body 82, then by aligning the semi-cylindrical grooves 106 and 108, and reinserting the spring pin 110.

Fasteners employing the adjustable receptacle according to the present invention can be used with conventional grommets, as shown in FIG. 2, or with grommets according to another aspect of the present invention. As can best be seen from FIGS. 6 and 7, the grommet according to the present invention, which is designated generally by the reference numeral 120, has a generally cylindrical body 122, a larger flange 124 extending radially outward from a firs body portion 125 at one end of the body 122, a smaller Flange 125 directed radially outwardly from a second body portion 127 at the opposite end of the body, a smaller bore 128, and a counterbore 130 defining with the smaller bore a shoulder 132 facing the end of the body 122 having the larger flange 124. Diametrically opposed slots 134 are formed in the cylindrical body 122, extending from a closed end in the second body portion 127 adjacent to the shoulder 132 to an open end extending through the end of the grommet 120 distal to the larger flange 124. Each slot 134 has a width greater than the diameter of the cross pin 74 of the stud 54. As was described earlier, a spring 136 is positioned on the shaft 70 of the stud 54 and is visible in FIG. 6, where it is shown in its relaxed, or expanded, condition. The spring 136 is received in the cup member 76 and, thus, the spring 136 biases the cup member away from the head 72 of the stud 54. The cup member 76 engages the shoulder 132 defined between the smaller bore 128 and the counterbore 130 of the grommet 120. A slot 138 or other formation is defined in the head 72 of the stud 54 to receive a tool, such as a screw driver, for turning the head to engage or disengage the fastener.

Figure 6:
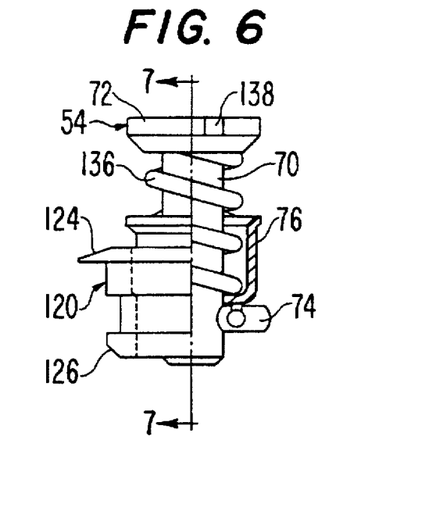
FIG. 6 is a front view of an assembly of a grommet according to the present invention with a stud, with the grommet removed from the right side of the drawing and a part associated with the stud shown in cross section.
Figure 7:
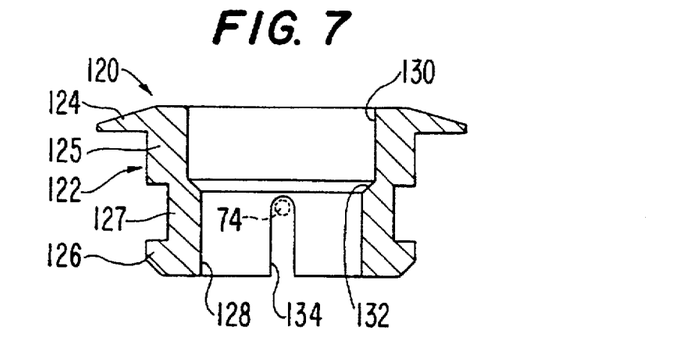
FIG. 7 is a cross section of the grommet according to the present invention taken along the line 7—7 in FIG. 6.

A pliers must be used to insert the stud 54 into the grommet 120, and this is accomplished by forcing the cup 76 toward the head 72 of the stud against the bias of the spring 136 with the pliers, while holding the shaft 70 of the stud at an angle to the longitudinal axis of the grommet and inserting the stud into the bores 130 and 128 of the grommet. When the pliers is released, the grommet 120 is captured by the stud 54, since the length of the cross pin 74 of the stud is greater than the inner diameter of at least the smaller bore 128 of the grommet. Without moving the cup 76 toward the head 72 of the stud 54, the stud cannot be inserted in the grommet, even at an angle, because there is not enough distance between the cup 76 and the cross pin 74. It can be appreciated that, for a stud of a particular length, the stud cannot be inserted into a grommet even with the cup moved as close as possible to the head of the stud if the grommet exceeds a certain axial length. However, with the grommet 120 according to the present invention, the stud 54 need be inserted only until the cross pin 74 reaches the closed ends of the slots 134. Although the length of the cross pin 74 is greater than the inner diameter of at least the smaller bore 128 of the grommet body 122, the cross pin can be accommodated in the slots 134. With the slot structure, the axial length of the grommet 120 can be increased, and the stud 54 still inserted, while the distance from the closed end of the slot 134 to the end of the body 122 of the grommet 120 having the larger flange 124 is kept constant. The grommet according to the present invention can be used with the receptacle according to the present invention, and can also be used with conventional receptacles and conventional ¼ turn fasteners.

Figure 8:
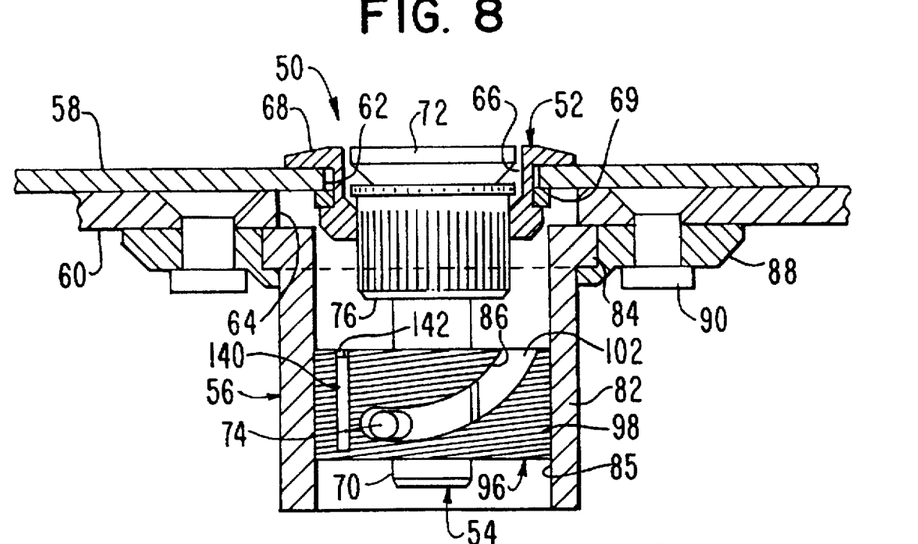
FIG. 8 is a cross section of a second embodiment of the fastener according to the present invention, with the barrel shown in front elevation.
Figure 9:
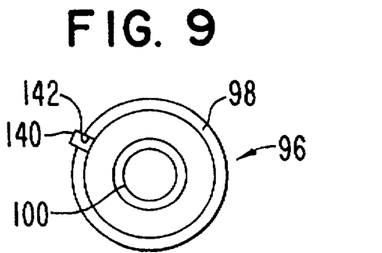
FIG. 9 is a bottom view of the barrel of the fastener of FIG. 8.

As can be seen from FIGS. 8 and 9, in a second embodiment of the fastener according to the present invention, all of the parts are the same as with the embodiment of FIGS. 2-7, with the exception of the locking mechanism 104, including the grooves 106 and 108 and the roll spring pin 110. Instead, in the embodiment of FIGS. 8 and 9, the locking mechanism comprises a resilient fixing material, such as nylon, in the form of a strip 140. The resilient fixing strip 140 extends most of the axial length of the barrel 96 and is held in a tight frictional fit in a groove 142 machined through the threads 98 of the barrel 96 in a direction parallel to the axis of the barrel. The threads of the receptacle body 82 which interengage the threads 98 of the barrel project into and deform the resilient fixing strip 140. The resilient engagement between the resilient fixing strip 140 and the threads of the receptacle body 82 prevents rotational movement of the barrel 96 relative to the body 82 when the fastener is either connected or disconnected by the turning of the stud 54 with an appropriate tool. However, the application of a rotational force of a magnitude greater than that required for normal connection or disconnection of the fastener 50 results in the turning of the barrel 96 relative to the body 82. Thus, the barrel 96 can be moved downward in the body 82 upon the application of a tightening force to the stud 54 beyond that required for normal connection of the fastener 50. The barrel 96 can be adjusted upwardly in the body 82 by the application of a force of the same magnitude required for adjusting of the barrel downward in the body. However, application of a force to adjust the barrel 96 upward is best accomplished by removal of the stud 54 and the cup member 76 and insertion of a screwdriver into the upper ends of the curved slots 102 in the barrel 96. The resistance encountered in connecting or disconnecting the fastener 50 according to the present invention is on the order of 4–5 inch pounds. The resilient fixing material, such as the strip 140, provides a resistance to the turning of the barrel 96 on the order of 15–20 inch pounds. Thus, it can be appreciated that the fastener 50 can be connected and disconnected without danger of accidentally moving the barrel 96 relative to the body 82. However, upon the application of a significantly greater force, the barrel 96 does rotate to permit adjustment of the fastener 50.

Figure 10:
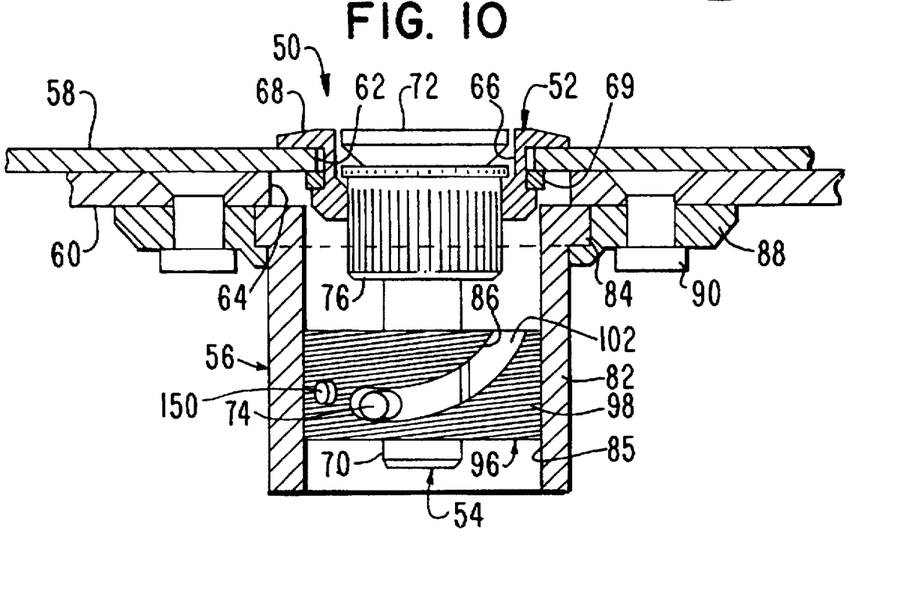
FIG. 10 is a cross section of a third embodiment of the fastener according to the present invention, with the barrel shown in front elevation.
Figure 11:
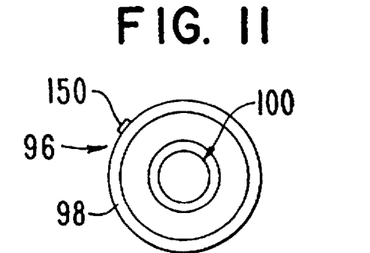
FIG. 11 is a bottom view of the barrel of the embodiment of FIG. 10.
Figure 12:
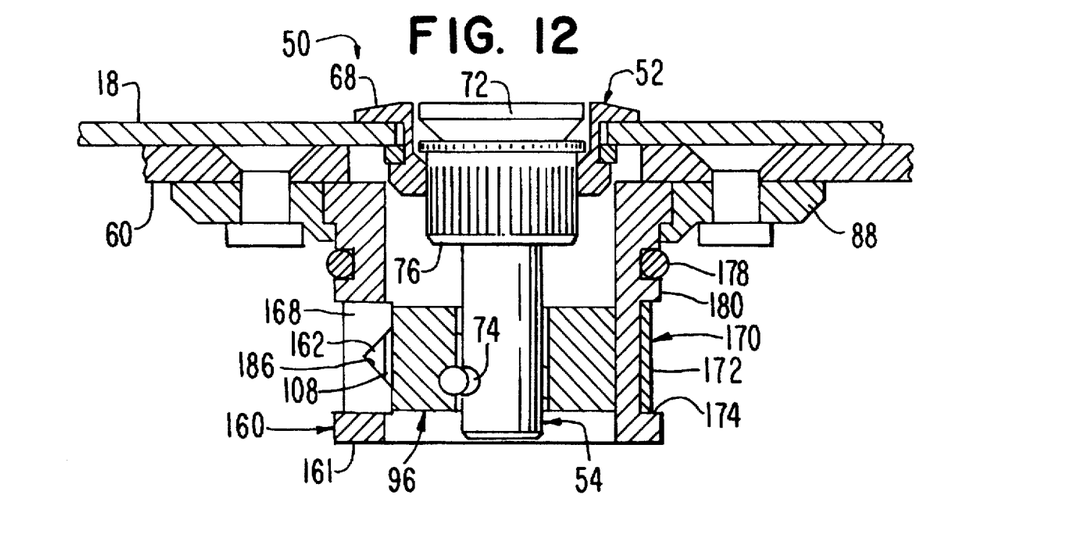
FIG. 12 is a cross section of a fourth embodiment of the fastener according to the present Invention.

As can be seen from FIGS. 10 and 11, in a third embodiment according to the present invention, all of the parts and features are the same as in the embodiment of FIGS. 2–7 with the exception that the locking mechanism 104, including the grooves 106 and 108, and the roll spring pin 110 are omitted. Instead, the embodiment of FIGS. 10 and 11 employs a resilient fixing material which is the same in all respects as the locking mechanism of FIGS. 8 and 9 except for the shape of the resilient fixing member. In the embodiment of FIGS. 10 and 11 the resilient fixing element is in the form of a cylinder or pellet 150 secured in a radial bore through the threads 98 of the barrel 96. The pellet 150 projects radially beyond the threads 98 for engagement with the threads of the body 82.

It is understood that the resilient fixing material can take other forms not specifically described and illustrated herein. For example, the resilient fixing material can comprise a coating covering a portion or portions or all of the surface of the threads 98 of the barrel 96, or a portion or portions or all of the surface of the threads of the body 82.

As can be seen from FIGS. 12–17, in a fourth embodiment to the present invention, all of the parts and features are the same as in the embodiment of FIGS. 2–7, except for differences shown in the drawing figures and/or described hereinafter. The embodiment of FIGS. 12–17 has a locking mechanism in which a locking member extends into aligned slots on a receptacle body and a barrel. However, instead of axially inserting a roll spring pin or other element into open-ended grooves or slots, a locking element is inserted laterally or generally radially into aligned slots. More specifically, a receptacle 160 has a receptacle body 161 which includes a slot or opening 162 which extends through the receptacle body, and the groove 108 of the barrel 96, which can be described as a slot or a recess, is parallel to and registrable with the opening 162 through the receptacle body. The opening 162 extends from a cylindrical bore in the receptacle body 161, through a wall of the receptacle body and through an outer surface of the receptacle body.

A fixing member 168 for fixing the barrel 96 from movement relative to the receptacle body 161 extends from outside the outer surface of the receptacle body, through the opening 162 and into the recess 108. The fixing member 168 is a part of a locking clip 170, which in plan is shaped generally like a 'G' and is made of a resilient material, such as spring steel. The locking clip 170 has an annular portion 172 having an inner diameter which, in a relaxed condition of the locking clip, is no greater than approximately the outer diameter of the receptacle body 161. The locking clip 170 extends around and in engagement with the receptacle body 161, and thereby secures the fixing member 168 to the receptacle body. The fixing member 168 extends laterally inward from the annular portion 172 of the locking clip and has a length sufficient to extend through the opening 162 of the receptacle body and into the recess 108 of the barrel 96. Thus, when the locking clip 170 is installed on the receptacle body 161, the fixing member 168 is biased into the opening 162 by the resilience of the locking clip. When the barrel 96 is rotated to a position in which the recess 108 in the barrel is aligned with the opening 162 in the receptacle body 161, the locking clip 170 biases the locking member 168 into the recess 108.

The exterior surface of the receptacle body 161 defines two annular channels, a major annular channel 174 for receiving the annular portion 172 of the locking clip 170 and a minor annular channel 176 for receiving a sealing ring 178, such as an O-ring. The annular channels 174 and 176 are separated by an annular ridge 180 on the receptacle body 161. Even when the fixing member 168 is positioned entirely out of the opening 162 of the receptacle body 161, the locking clip 170 is retained on the receptacle body.

Figure 13:
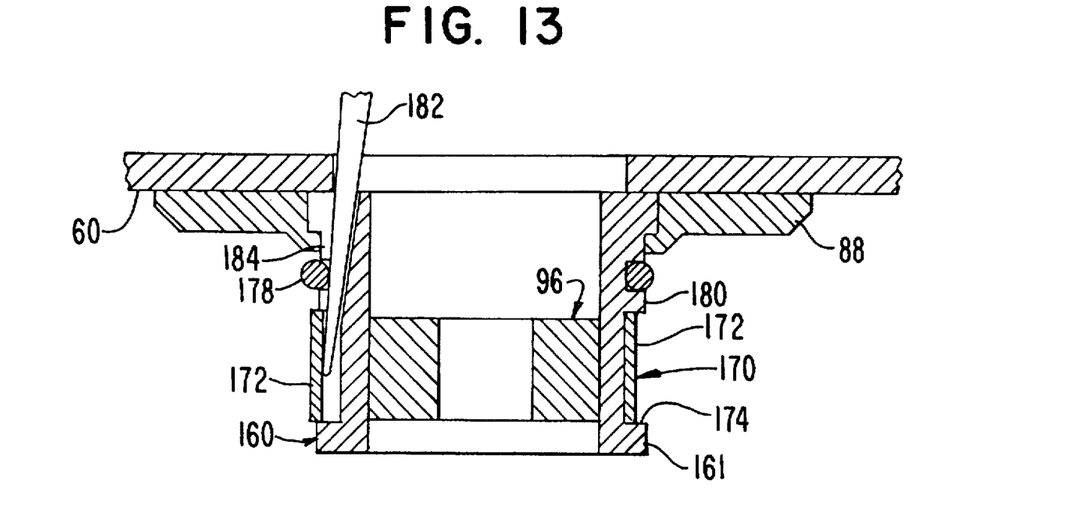
FIG. 13 is a cross section taken along the line 13-13 of FIG. 14 with a tool inserted to release the locking clip.
Figure 14:
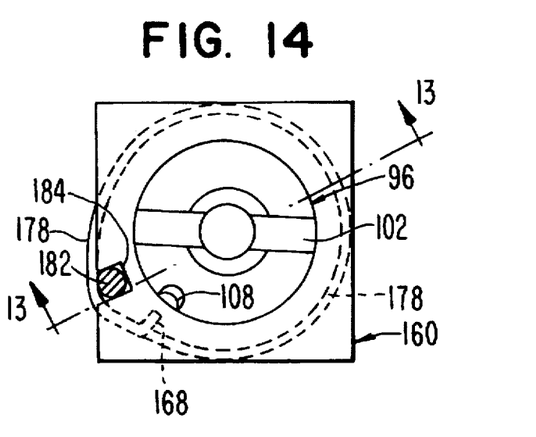
FIG. 14 is a top view of the fastener of FIG. 12 with the stud removed.
Figure 15:
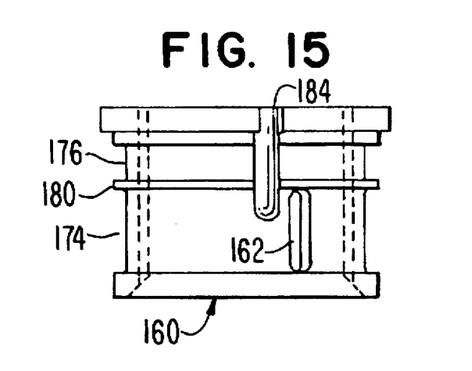
FIG. 15 is a front view of the receptacle body of the fastener of FIG. 12.
Figure 16:
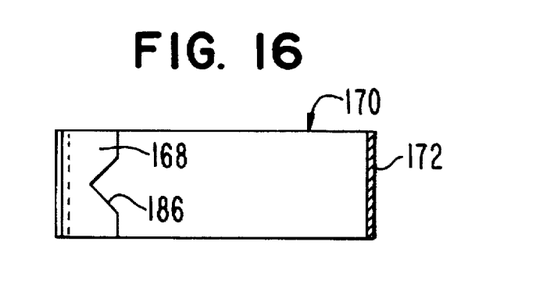
FIG. 16 is a cross section of the locking clip of the fastener of FIG. 12.
Figure 17:
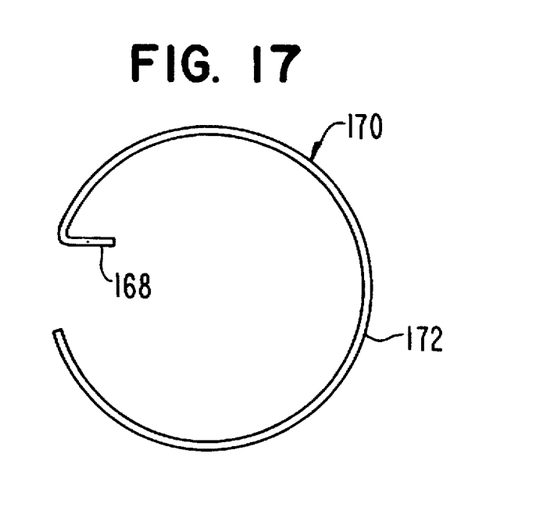
FIG. 17 is a top view of the locking clip of FIG. 16.

As can be appreciated from FIGS. 13 and 14, the fixing member 168 can be removed from the recess 108 and the opening 162 by inserting a pointed tool 182 between the exterior surface of the receptacle body 161 and the annular portion 172 of the locking clip 170 and using the receptacle body as a fulcrum to move the annular portion 172 away from the receptacle body. Insertion of the pointed tool 182 is made possible by an insertion recess 184 defined in the wall of the receptacle body 161. As can best be seen from FIGS. 1315, the insertion recess 184 is a groove having one end opening through the top of the wall of the receptacle body 161, the depth of the groove diminishing to zero where the opposite end of the groove opens through the exterior of the side wall, in the major annular channel 174 and along the inside of the annular portion 172 of the locking clip 170. As the pointed tool 182 moves through the insertion recess 184 and into engagement with the locking clip 170, it passes under the sealing ring 178 and, if necessary, deforms the sealing ring outward.

The insertion recess 184 is circumferentially spaced along the wall of the receptacle body 161 about 20° from the opening 162, so that the pointed tool 182 engages the annular portion 172 of the locking clip 170 near the juncture of the fixing member 168 with the annular portion. The fixing member 168 defines an acute angle, for example, about 60°, with the annular portion 172 at the juncture. The advantage of such an angle relative to a 90° angle is that the fixing member 168 provides greater resistance to the turning of the barrel 96 in the tightening direction than in the untightening direction. In addition, the acute angling of the fixing member 168 reduces the distance that the annular portion 172 must be moved away from the receptacle body 161 in order to free the barrel 96 for rotation.

It can be appreciated from FIG. 13 that the insertion recess 184 is accessible to the pointed tool 182 when the upper panel 58 is removed but the lower panel 60 blocks access to the back of the receptacle body 161. Where access is available to the back of the receptacle body 161, the pointed tool 182 can be inserted from the side of the receptacle body into the opening 162 in the receptacle body 161 and alongside the fixing member 168. A recess, such as a notch 186, is defined in the fixing member 168 to receive the tool 182 so that the fixing member can be pried out of the recess 108 of the barrel 96, thereby permitting rotation of the barrel relative to the receptacle body. In this manner, the tool 182 can even pry the fixing member 168 out of the opening 162 of the receptacle body 161.

Figure 18:
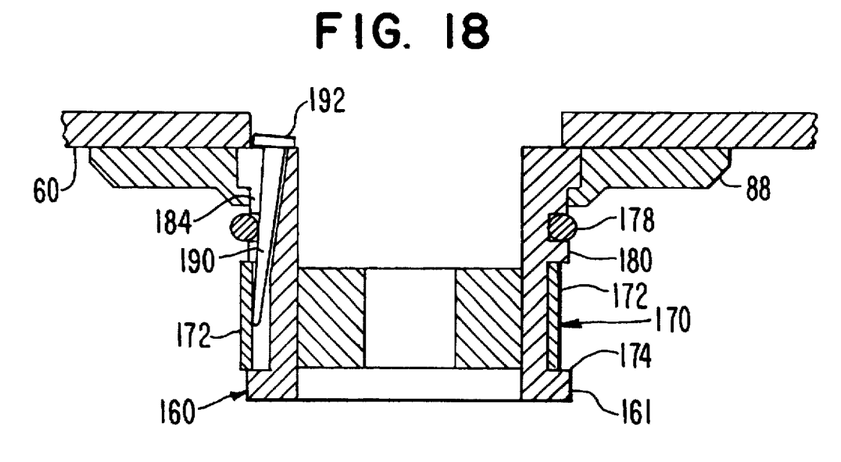
FIG. 18 is a cross section like FIG. 13, but with a nail inserted rather than a tool.

As can be seen from FIG. 18, the adjustable fastener 50 of the present invention can be assembled with an element such as a nail 190, or pin, holding the fixing member 168 out of the recess 166 of the barrel 164. The nail 190 makes the same space that the pointed tool 182 makes when the tool is inserted to remove the fixing member 168 from the recess 166 of the barrel 164. The nail 190 terminates in an enlarged head 192 lying above the top of the receptacle body 161 and below the upper surface of the inner panel 60. The nail 190 is removable with pliers. As a result, when the nail 190 is removed, the fixing member 168 is free to move into the recess 108 of the barrel 96 when the fixing member 168 is in registration with the recess.

The use of one or more of the adjustable fasteners 50 with a pre-assembled nail 190 greatly speeds up the adjusting of the fasteners to have the right tightness for the two panels being fastened. In the method according to the present invention, when one or more of the receptacles 160 with the nails 190 is installed on the inner panel 60, the outer panel 58 containing a corresponding number of appropriately positioned grommets 52 is placed on the inner panel 60 such that the grommets 52 are concentric with the receptacles 160. The stud 54 of each fastener 50 is turned sufficiently to place the fastener in a locked condition. In such a condition, the outer panel 58 in the area of the fastener 50 may or may not be held to the inner panel 60 as tightly as desired. Greater tightness can be provided by further rotation of the stud 54 relative to the receptacle 56. Rotation of the stud 54, already in a locked condition, causes the barrel 96 to rotate relative to the receptacle 160 and move axially as well. Thus, the stud 54 of each fastener 50 can be turned until the desired tightness between the panels 58 and 60 is achieved.

When sufficient tightness is present, the studs 54 are rotated to unlock the fastener 50, the outer panel 58 is removed, and the nails 190 are pulled from the fasteners 50 and discarded. The nails 190 are preferably made of a nonmetallic material, such as a plastic. If the fixing member 168 of a fastener 50 is in alignment with the recess 108 of the barrel 96, the fixing member is biased into the recess by the annular portion 172 of the locking clip 170. As a result, in normal operation, the barrel 96 cannot move relative to the receptacle body 161, but the stud 54 can be turned and removed from the receptacle.

If the fixing member 168 is not in alignment with the recess 166 when the nail 190 is removed, the fixing member will pop into the recess the first time that the recess is aligned with the fixing member. As a result, the barrel 96 can be turned only less than one complete revolution before further turning of the barrel is prevented by the fixing member 168 popping into the recess 108. The axial movement of the barrel 96 caused by one revolution of the barrel in the receptacle 56 is sufficiently small that a suitably tight securement of the panel 58 to the panel 60 is not lost by a turning of the barrel in the loosening direction.

After the nails 190 are removed, the outer panel 58 is again placed on the inner panel 60, and the fastener or fasteners 50 are turned to their locking condition by, for example, one quarter turn of the studs 54. After the nails 190 are removed, the fastener 50 can be further adjusted by removal of the outer panel 58 and the use of the pointed tool 182 in the manner describe previously herein.

Having thus described the present invention and its preferred embodiments in detail, it will be readily apparent to those skilled in the art that further modifications to the invention may be made without departing from the spirit and scope of the invention as presently claimed.

I claim:

1. A fastener for holding together first and second elements, wherein each element has an aperture for receiving the fastener, a first side in engagement with the other of said elements, and a second side facing away from the other of said elements, comprising:

a grommet having an opening and a radially outward extending flange for engaging the second side of said first element;

a stud having opposite ends, a head at one of said ends, and a cross pin adjacent to the other of said ends, said stud being received in the opening of the grommet; and a receptacle including a first member for securement to the second element, a second member defining an end facing said grommet and means for receiving the cross pin of the stud, means for connecting said second member to said first member for movement relative to said first member, and means for fixing said second member from movement relative to said first member, wherein said cross pin receiving means comprises a central opening in said second member and diametrically opposed cam and locking surfaces open to said central opening, said stud extending into said central opening, and said cross pin being engageable with said cam and locking surfaces, and said cam and locking surfaces are defined in curved slots n said second member, each said slot having an open end extending through the end of the second member facing the grommet.

2. The fastener of claim 1, wherein said first member of said receptacle defines a cylindrical bore having internal threads, and said second member of said receptacle defines external threads, said internal threads and said external threads being in threaded engagement with one another, said means for connecting said second member for movement relative to said first member comprising said internal threads and said external threads.

3. The fastener of claim 2, wherein said means for fixing comprises:

a first slot in said first member, said first slot having an opening facing said second member;

a second slot in said second member, said second slot having an opening facing said first member; and a fixing member positioned in both said slots.

4. The fastener of claim 3, further comprising means for biasing said fixing member into said slots.

5. The fastener of claim 4. further comprising a member securing said fixing member to the fastener.

6. The fastener of claim 1. wherein said first member of said receptacle defines a bore. said second member of said receptacle is positioned in said bore of said first member, and said cross pin has a length greater than the central opening of said second member and less than the bore of said second member.

7. The fastener of claim 1. further comprising means for biasing said cross pin of said stud into engagement with said cam and locking surfaces.

8. A receptacle for a fastener for holding together first and second elements, wherein each element has an aperture for receiving the fastener, a first side in engagement with the other of said elements. and a second side facing away from the other of said elements, the fastener includes a grommet having an opening and a radially outward extending flange for engaging the second side of said first element, and the fastener further includes a stud having opposite ends, a head at one of the ends, and a cross pin adjacent to the other of the ends, the stud being received in the opening of the grommet, the receptacle comprising:

a first member for securement to the second element;

a second member defining an end facing the grommet and means for receiving the cross pin of the stud;

means for connecting said second member to said first member for movement relative to said first member; and means for fixing said second member from movement relative to said first member.

wherein said first member of said receptacle defines a cylindrical bore having internal threads. and said second member of said receptacle defines external threads. said internal threads and said external threads being in threaded engagement with one another, said means for connecting said second member for movement relative to said first member comprising said internal threads and said external threads. and wherein said means for fixing comprises:

a first slot in said first member, said first slot having an opening facing said second member;

a second slot in said second member, said second slot having an opening facing said first member; and a fixing member positioned in both said slots.

9. The receptacle of claim 8. wherein said cross pin receiving means comprises a central opening in said second member and diametrically opposed cam and locking surfaces open to said central opening for engagement with the cross pin of the stud, and said cam and locking surfaces are defined in curved slots i- said second member, each said slot having an open end extending through the end of the second member facing the grommet.

10. The receptacle of claim 8. further comprising means for biasing said fixing member into said slots.

11. The receptacle of claim 10. further comprising means for biasing said fixing member into said slots.

12. A fastener for holding together first and second elements, wherein each element has an aperture for receiving the fastener, a first side in engagement with the other of said elements, and a second side facing away from the other of said elements, comprising:

a grommet having an opening and a radially outward extending flange for engaging the second side of said first element;

a stud having opposite ends, a head at one of said ends, and a cross pin adjacent to the other of said ends, said stud being received in the opening of the grommet; and a receptacle including a first member for securement to the second element, a second member defining means for receiving the cross pin of the stud, means for connecting said second member to said first member for movement relative to said first member, and means for fixing said second member from movement relative said first member, wherein said first member of said receptacle defines a cylindrical bore having internal threads, and said second member of said receptacle defines external threads, said internal threads and said external threads being in threaded engagement with one another, said means for connecting said second member for movement relative to said first member comprising said internal threads and said external threads, and wherein said means for fixing comprises:

a first slot in said first member;

a second slot in said second member, said second slot having an opening facing said first member; and a fixing member positioned in both said slots.

13. The fastener of claim 12, wherein said first slot is an opening through said first member, and said second slot is a recess in said second member.

14. The fastener of claim 13. wherein said first member has an outer surface, and said opening extends from said cylindrical bore outwardly through said first member and through the outer surface of said first member, and said fixing member extends from outside the outer surface of said first member, through said opening and into said recess.

15. The fastener of claim 13. further comprising means or biasing said fixing member into said opening and said recess.

16. The fastener of claim 13. further comprising a member securing said fixing member to the fastener.

17. The fastener of claim 15. wherein said biasing means comprises a securing member securing said fixing member to the fastener.

18. The fastener of claim 17. wherein said securing member comprises a member extending annularly with respect to said first member and engaging said first member.

19. The fastener of claim 15. wherein said fixing member defines, in a portion of said fixing member inside the outer surface of said first member, a recess for receiving a removal tool.

20. The fastener of claim 18. wherein said first member defines a recess for receiving a removal tool, and said tool receiving recess faces said member extending annularly.

21. The fastener of claim 12. further comprising means for biasing said fixing member into said slots, and removable means for defeating said biasing means to hold said fixing member out of said second slot.

22. The fastener of claim 21, wherein said removable means comprises an elongate element interposed between said biasing means and said first member, said elongate element having a portion protruding from said biasing means and said first member to facilitate removal from the fastener.

23. A receptacle for a fastener for holding together first and second elements, wherein each element has an aperture for receiving the fastener, a first side in engagement with the other of said elements, and a second side facing away from the other of said elements, the fastener includes a grommet having an opening and a radially outward extending flange for engaging the second side of said first element, and the fastener further includes a stud having opposite ends, a head at one of the ends, and a cross pin adjacent to the other of the ends, the stud being received in the opening of the grommet, the receptacle comprising:

a first member for securement to the second element, a second member defining means for receiving the cross pin of the stud, means for connecting said second member to said first member for movement relative to said first member, and means for fixing said second member from movement relative to said first member, wherein said first member of said receptacle defines a cylindrical bore having internal threads, and said second member of said receptacle defines external threads, said internal threads and said external threads being in threaded engagement with one another, said means for connecting said second member for movement relative to said first member comprising said internal threads and said external threads, and wherein said means for fixing comprises:

an opening through said first member;

a recess in said second member, said recess facing said first member; and a fixing member positioned in said opening and said recess.

24. The receptacle of claim 23, wherein said first member has an outer surface, and said opening extends from said cylindrical bore outwardly through said first member and through the outer surface of said first member, and said fixing member extends from outside the outer surface of said first member, through said opening and into said recess.

25. The receptacle of claim 23, further comprising means for biasing said fixing member into said opening and said recess.

26. The receptacle of claim 23, further comprising a member securing said fixing member to the fastener.

27. The receptacle of claim 25, wherein said biasing means comprises a securing member securing said fixing member to the fastener.

28. The receptacle of claim 27, wherein said securing member comprises a member extending annularly with respect to said first member and engaging said first member.

29. The receptacle of claim 25, wherein said fixing member defines, in a portion of said fixing member inside the outer surface of said first member, a recess for receiving a removal tool.

30. The receptacle of claim 28, wherein said first member defines a recess for receiving a removal tool, and said tool receiving recess faces said member extending annularly.

31. The receptacle of claim 23, further comprising means for biasing said fixing member into said opening and said recess, and removable means for defeating said biasing means to hold said fixing member out of said second slot.

32. The receptacle of claim 31, wherein further comprising means for biasing said fixing member into said slots, and removable means for defeating said biasing means to hold said fixing member out of said second slot.

33. A method for holding together first and second elements, wherein each element has an aperture for receiving the fastener, a first side in engagement with the other of said elements, and a second side facing away from the other of said elements, using at least one fastener including a grommet having an opening and a radially outward extending flange for engaging the second side of said first element;

a stud having opposite ends, a head at one of said ends, and a cross pin adjacent to the other of said ends, said stud being received in the opening of the grommet; and a receptacle including a first member for securement to the second element, a second member defining means for receiving the cross pin of the stud, means for connecting said second member to said first member for movement relative to said first member, and means for fixing said second member front movement relative to said first member, wherein said means for fixing comprises a fixing member, said first member of said receptacle defines a cylindrical bore having internal threads, and said second member of said receptacle defines external threads, said internal threads and said external threads being in threaded engagement with one another, said means for connecting said second member for movement relative to said first member comprising said internal threads and said external threads;

means for biasing said fixing member into said slots; and removable means for defeating said biasing means to hold said fixing member out of said second slot, the method comprising:

placing the first and second elements together such that the grommet is aligned with the receptacle;

turning the stud in a first direction sufficiently to place the fastener in a locked condition;

turning the stud further in the first direction until the fastener holds the first and second elements together with the desired amount of tightness;

turning the stud in a second direction opposite to the first direction to place the fastener in an unlocked condition;

separating the first and second elements from one another;

removing said removable means;

again placing the elements together such that the grommet is aligned with the receptacle; and again turning the stud in a first direction sufficiently to place the fastener in a locked condition.

* * * * *